Inventors
John R. Maifeld, Jr.
Kenneth L. Rains
By their Attorney

Richard B. Megley

# United States Patent Office 3,605,151
Patented Sept. 20, 1971

3,605,151
METHOD FOR APPLYING COATING MATERIAL
John R. Maifeld, Jr., Lynnfield, Mass., and Kenneth L. Rains, Murphysboro, Ill., assignors to USM Corporation, Boston, Mass.
Filed June 2, 1969, Ser. No. 829,308
Int. Cl. A43d
U.S. Cl. 12—146D
2 Claims

ABSTRACT OF THE DISCLOSURE

A method for providing a pervious article of commerce with a permanently stiffened three dimensional configuration comprising applying a coating of hot viscous synthetic polymeric material to one side of the article while subjecting the opposite side to a vacuum, cooling the article, and applying conforming pressure to shape the article.

FIELD OF THE INVENTION

This invention relates to a novel method for applying molten material to a work piece.

BACKGROUND OF THE INVENTION

U.S. Pat. No. 3,316,573, issued May 2, 1967, in the names of Chaplick et al., teaches a method of providing shoe components in permanently stiffened three dimensional configuration. Reduced to its barest essentials, the method comprises applying a coating of viscous molten thermoplastic synthetic polymeric material to a shoe component, cooling the thermoplastic material and applying conforming pressure to shape the shoe component to the desired three dimensional configuration.

The initial step in the method just outlined, i.e. applying the coating, is most commonly accomplished in a machine such as described in U.S. Pat. No. 3,277,867, issued Oct. 11, 1967, in the names of C. O. Kilham et al. The method and machine have had wide commercial acceptance and success since their initial introduction to the market place.

One problem has, however, persisted since the initial use of the machine to apply the coating material. Under certain conditions not clearly defined or consistently present in toto, bubbles are formed in the coating of thermoplastic material applied to the shoe component. This phenomena has been found to occur more frequently on certain types of material, when the humidity is high, when the component has been tanned in a particular manner, and when the component has a relatively high moisture content. There is, however, no clear pattern to indicate when this undesirable bubbling will or might occur. Indeed, it has not been firmly determined that any one or more of the above described conditions are prerequisites to the phenomena.

The presence of bubbles, or air or gas pockets, is highly undesirable. The bubbles produce or provide an irregular coating thickness and surface on the underside of the shoe component. The uniformity, on occasion the existence, of the stiffening effect of the coating is lost. Frequently, the unattractive outline of the bubbles appears on the outside of the shoe component when conforming pressure is applied resulting in an esthetically unpleasing appearance.

SUMMARY OF THE INVENTION

The bubbling phenomena described above is eliminated in the practice of this invention by application of a vacuum force to the locale where adhesive material is applied. An improved machine of the type described in U.S. Pat. No. 3,277,867, to C. O. Kilham et al. having vacuum applying instrumentalities associated therewith is disclosed in a divisional application filed in the names of the present inventors.

The features of the invention, together with various novel details of construction, which will hereafter be described with reference to the particular embodiment of the invention shown in the drawings are not to be construed as limited to the illustrated embodiment or to the shoe field. It is to be understood that the drawings are utilized for illustration purposes only and are not to be interpreted as limiting the scope or the field of use of this invention.

DESCRIPTION OF THE PREFERRED EMBODIMENT

Figure 1:
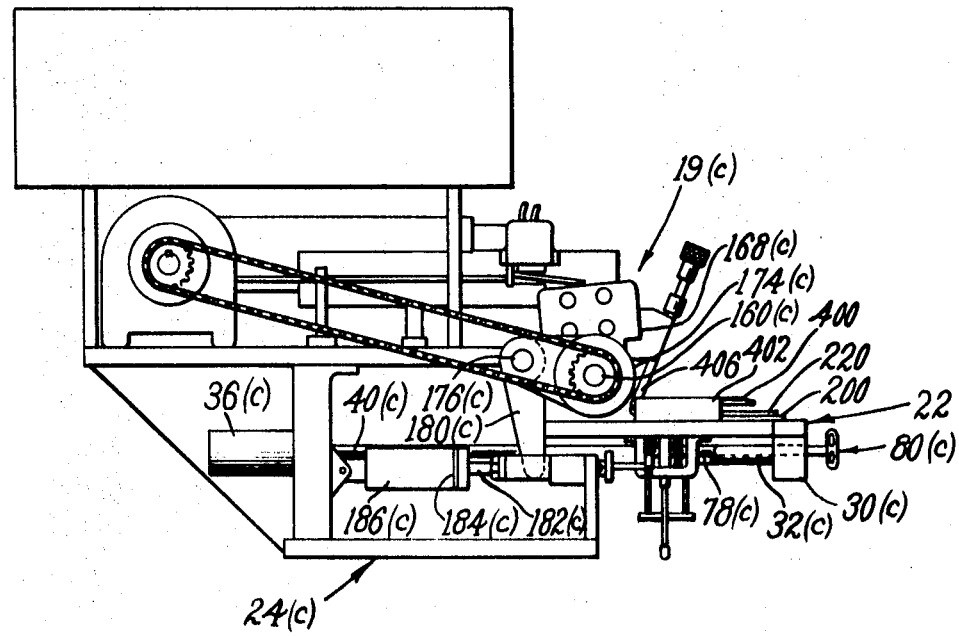
FIG. 1 is a view in side elevation of a machine embodying features of this invention.

Apparatus embodying the present invention is preferably employed essentially as an attachment to a machine generally of the type described in said U.S. Pat. No. 3,277,867; i.e., as additional structure to the basic machine apart from the applying instrumentalities. Accordingly, the present invention can most succinctly be defined by reference to said machine patent to avoid unnecessary repetitious detailed description of the machine.

In order to facilitate ready reference to the construction illustrated in said machine patent, reference characters employed herein to identify members of similar construction and/or function will numerically correspond to those in said machine patent and will be followed by the indicia (c).

Figure 6:
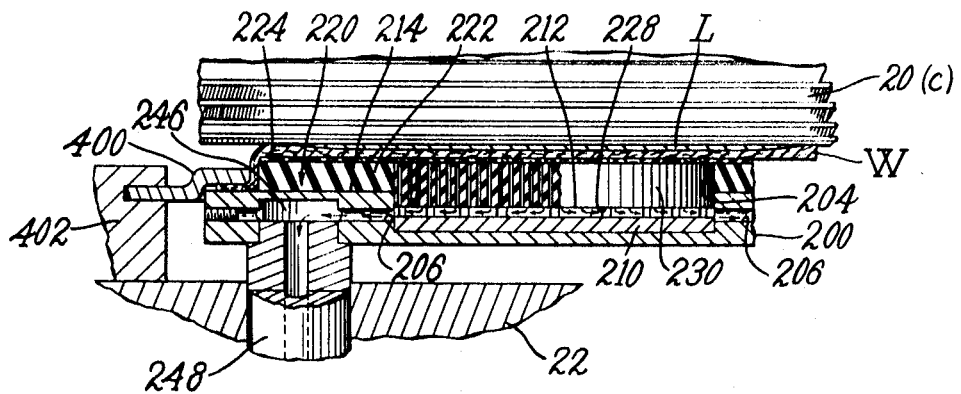
FIG. 6 is a sectional view illustrating the manner in which the vacuum is employed during the application of coating material.
Figure 7:
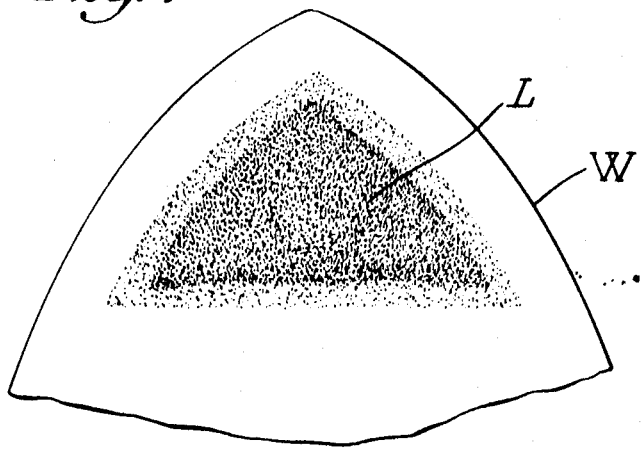
FIG. 7 is a plan view of the underside of a vamp of a shoe upper to which a stiffening coating has been applied.

As illustrated in FIG. 1, the machine has an applicator device 19(c) having an applicator roll 20(c), see FIG. 6, and a carriage 22 which is mounted for reciprocating movement on a machine frame 24 to move a workpiece W past the applicator roll.

The carriage 22 is mounted on four corner blocks 30(c), 30(c) which, in turn, are slidingly supported on guide rods 32(c), 32(c). Movement of the carriage 22 is accomplished as in the referenced machine patent by means including a cylinder 36(c) and a piston rod 40(c). The travel of the carriage is controlled by an adjusting shaft 78(c) and knurled knob portion 80(c).

The applicator roll 20(c), which is of elongated generally cylindrical shape, is formed integrally with a shaft 160(c). Opposite ends of the shaft 160(c) are mounted in end plates 168(c). An arm 174(c), connected to the shaft 160(c), is pivotally mounted on the machine frame by means of a rock shaft 176(c). The arm 174(c) is formed as a bell-crank lever with a downwardly extending arm 180(c) which is connected at its lower end to a piston rod 182(c). This piston rod is associated with a piston 184(c) received within a cylinder 186(c) which is pivotally mounted at one end of the machine frame 24(c). When the machine is at rest, this piston is at the extreme end of its movement to the right, see FIG. 1, so that the applicator device 19(c) is held in an elevated position. During the operation of the machine, the piston 184(c) will operate to cause the arm 174(c) to swing in a clockwise direction, thus lowering the applicator device.

Resting on the upper side of the carriage 22 is a work supporting pad 200 of generally rectangular shape having a plurality of dowel pins 202, 202 thereon. The work supporting pad has a circular vacuum cavity 204 formed in the central portion thereof of a depth substantially equal to the thickness of the pad 200. Vacuum passageways 206, 206 extend from opposite sides of the pad 200 to the cavity 204 whereby to permit the introduction of a vacuum to said cavity, as hereinafter discussed.

A grate 210 is received in the vacuum cavity 204. The thickness of the grate is such that its upper surface 212 is below the upper surface 216 of the pad 200 when the grate 210 is in position in the cavity 204, see particularly FIG. 6. The lower portion of the grate is solid and the upper portion comprises a plurality of intersecting slots whereby the grate 210 is of a waffle-like appearance. The slotted portion of the grate communicates with the vacuum passageways 206, 206 when the grate is in position in the pad 200 whereby the vacuum may be established in the interstices thereof.

Figure 5:
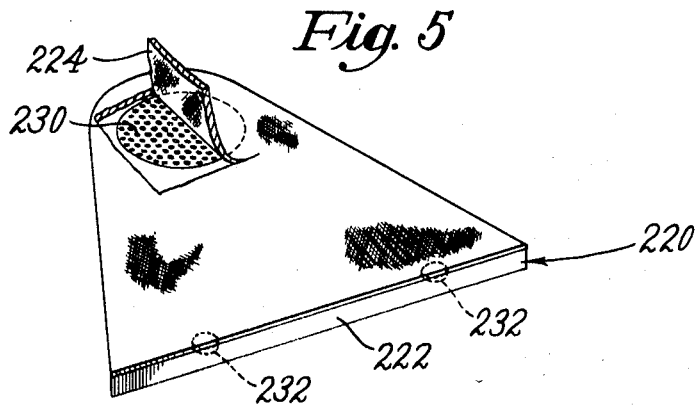
FIG. 5 is a perspective view of a matrix member associated with the vacuum applying apparatus showing a portion of the cover folded back to illustrate the construction thereunder.

A resilient, substantially triangular, matrix 220 rests on the upper surface of the pad 200. The matrix comprises a main body portion 222, a cloth covering 224 on the upper surface thereof, and a depending circular shoulder 228 at the forward portion thereof. The depending shoulder 228 and the circular section of the main body portion thereabove have a plurality of communicating apertures or passageways 230 extending therethrough (FIGS. 5 and 6). When the matrix 230 is positioned on the pad 200 the depending shoulder 228 is snugly received in the cavity 226 in engagement with the upper slotted portion of the grate 210. A plurality of apertures 232 on the underside of the matrix in position to be placed over the pins 202, together with the shoulder 228, facilitate accurate positioning of the matrix on the pad 200. The matrix is preferably constructed of rubber and the cloth cover 224 is accordingly used to avoid contact thereof with a work piece W introduced to the machine. The cover does not interfere with the application of the vacuum because of its pervious character.

Flexible hose 240 is used to communicate a vacuum to the passageways 206, 206. One end of the hose is connected to a convenient, conventional vacuum source, identified by the reference character 242. Opposite ends of the bifurcated hose are connected to couplings 246 (one of said couplings being illustrated in FIGS. 4 and 6) mounted in the pad 200. Metallic sleeves 248 are fixed to the sections of the hose 240 which are exposed to the carriage 22 to prevent frictional erosion of the flexible hose.

A vacuum created by the vacuum source 242 is thus communicated through hose 240, passageways 206, 206, slotted portion of the grate 210, and apertures 230 of the matrix 220 and applied to the opposite side of the work piece W to that which a coating L is to be applied. The application of a vacuum in a circular pattern has been found adequate to eliminate the undesirable bubbling in the application of stiffening materials to shoe vamps. However, if it is desired to apply the vacuum in a different pattern, the configuration of the cavity 206, the grate 210 and the matrix 220 may be appropriately altered without departing from the scope of the invention.

Figure 2:
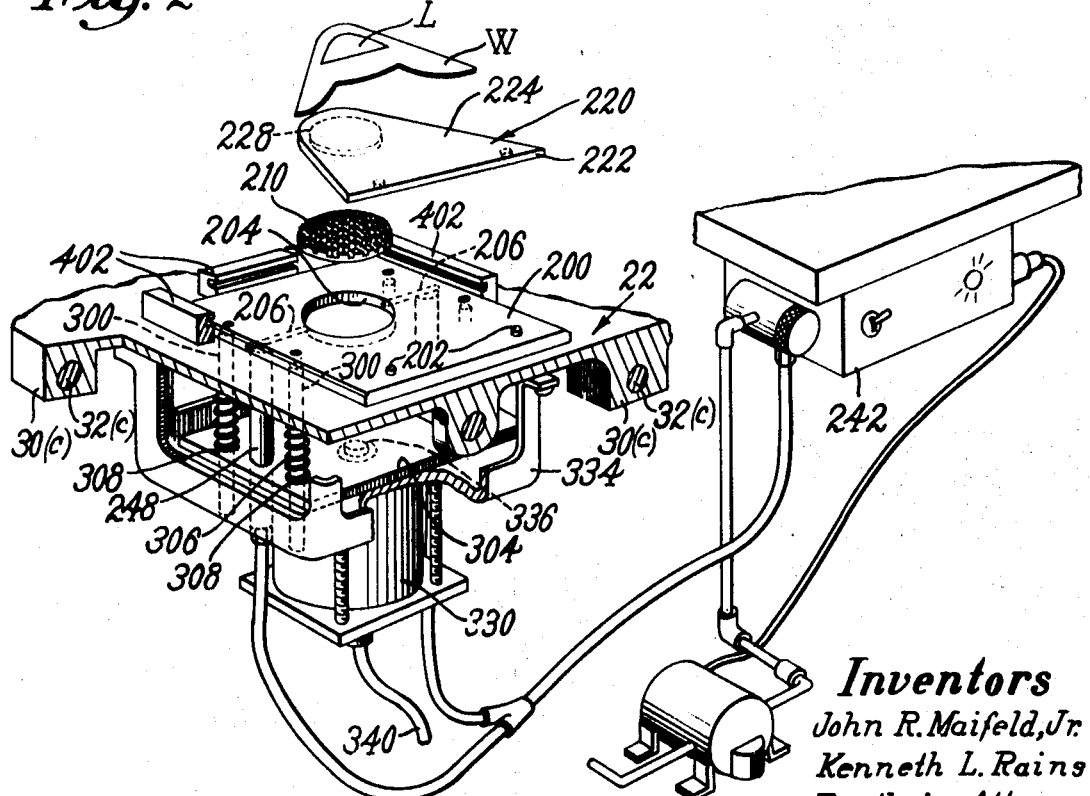
FIG. 2 is a perspective view, partly in section, of the vacuum applying apparatus of this invention showing certain elements of the apparatus in exploded relation.
Figure 4:
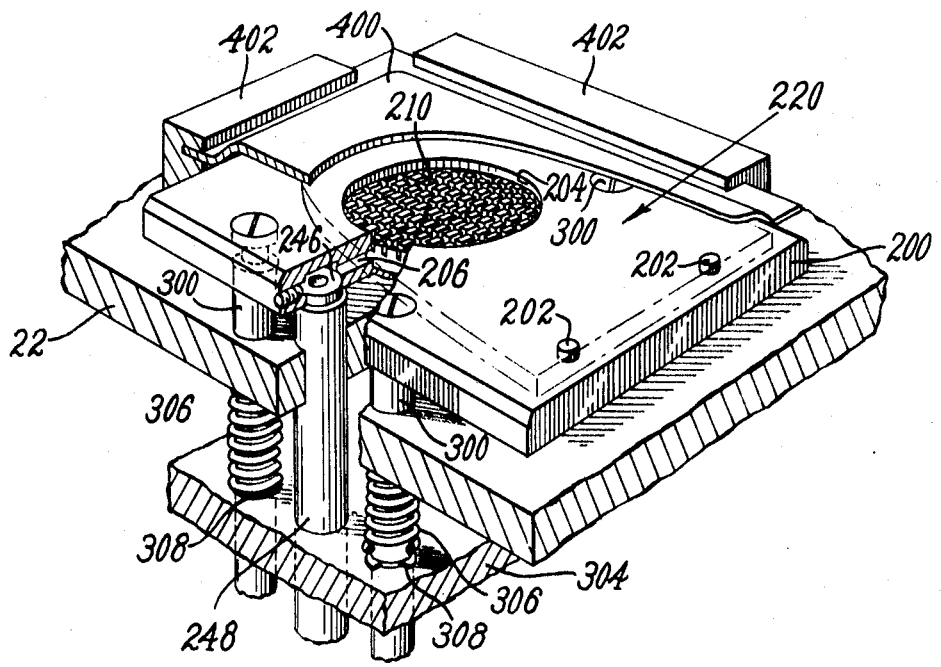
FIG. 4 is a perspective view, partly in section, of a portion of the vacuum applying apparatus showing certain components in operative position and the matrix in phantom.

The supporting pad 200 is mounted for vertical movement toward and away from the carriage 22 on posts 300 secured to opposite sides of the pad 200 and slidingly received in bores in the carriage 22. The posts 300 extend below the carriage 22 and are joined at their lower ends by means of a cross bar 304 movably mounted thereon. Coil springs 306 mounted on each of the posts 300, interposed between the underside of the carriage 22 and retaining rings 308 secured to the posts 300, normally urge the pad 200 into engagement with the carriage (FIGS. 2 and 4).

A cylinder 330 is mounted on the underside of a frame 334 depending from the underside of the carriage 22. A piston rod 336 connected to a piston housed within the cylinder is secured to the crossbar 304 (FIG. 2). When fluid pressure is admitted to the cylinder 330 through a conduit 340, the piston rod 336 drives the crossbar 304 upwardly. Upward movement of the crossbar 304 is translated to the posts 300 through the retaining rings 308 whereby the pad 200 is moved vertically away from the carriage 22.

A work piece W located on the matrix 220 is secured in a fixed position between the matrix 220, pad 200 and a clamping plate 400 when the pad is moved to its upper, operative position under the action of the piston rod 336, see particularly FIG. 6. The clamping plate is mounted in a fixed position above the carriage 22 in three support members 402. The clamping plate is of a configuration to overlie the work piece and to engage the same when the pad 200 is in its upper, operative position.

Figure 3:
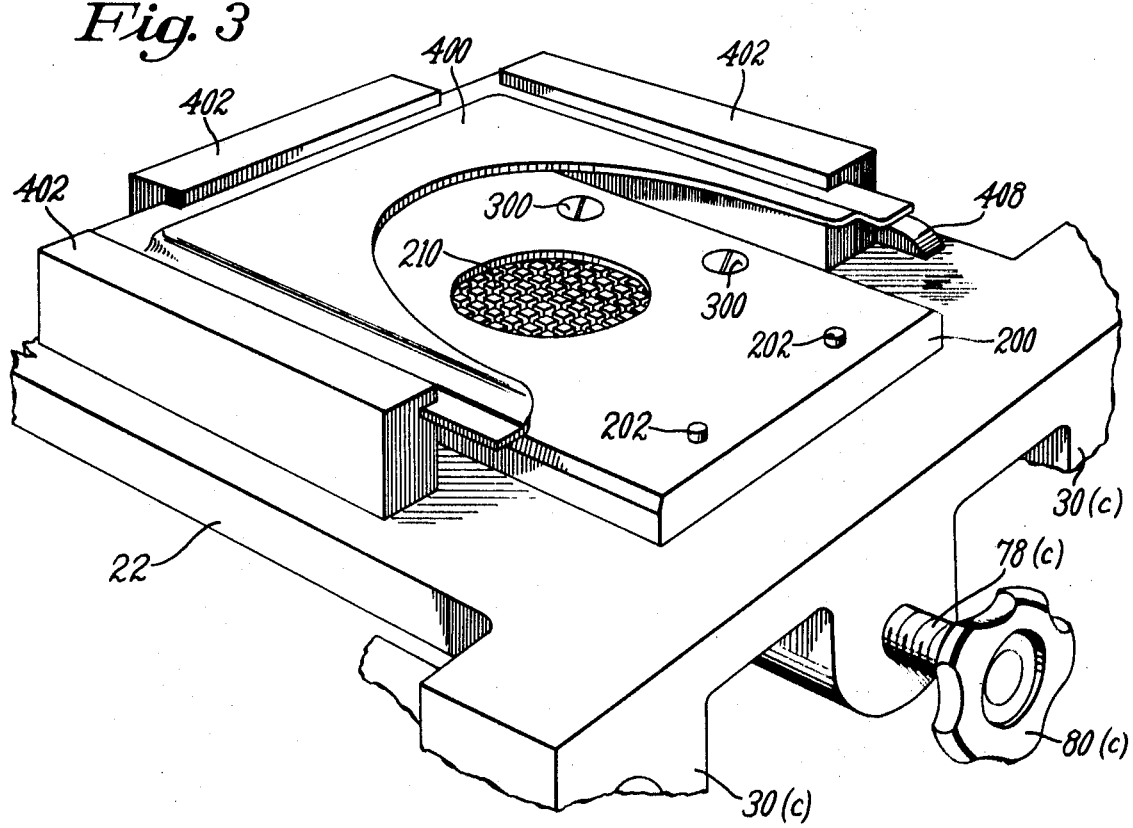
FIG. 3 is a perspective view of the upper portion of the apparatus illustrated in FIG. 2 with the matrix member removed.

When the work piece W is clamped in position in the manner just described, the carriage 22 is moved into operative position relative to the applicating device 19(c) in accordance with the teachings of the above referenced machine patent. The positioning of the applicator roll 20(c) relative to the work piece is preferably controlled by an adjustable cam follower 406 (FIG. 1) which rides along a cam surface 408 (FIG. 3) on the carriage 22. Coating material is applied to the work piece W in the manner described in said machine patent.

The method aspect of this invention can most readily be defined by making reference to said U.S. Pat. No. 3,316,573 to avoid repetitious recitation of descriptive material. The locus of the method improvement of the present invention resides in the use of a vacuum during the initial step of the method for providing an article in permanently stiffened configuration described in said method patent.

The method of this invention generally comprises, in its preferred embodiment, applying a coating of viscous synthetic polymeric material to one side of a pervious article in the area to be stiffened, concurrently subjecting the opposite side of the article to a vacuum at the area to be stiffened, cooling the material to form a stiffly resilient, adhered layer above the surface of the article and applying conforming pressure to shape the article to the desired three dimensional configuration.

The characteristics of the particular coating material preferably are as defined in said method patent.

Having thus described our invention, what we claim as new and desire to secure by Letters Patent of the United States is:

1. A method for providing a pervious article of commerce with a permanently stiffened three dimensional configuration which comprises the steps of applying a coating of hot viscous synthetic polymeric material to one side of the article in the area to be stiffened, concurrently subjecting the opposite side of the article to a vacuum at the area to be stiffened, cooling the said article to form a stiffly resilient, adhered layer above the surface of the article, and applying conforming pressure to shape the article to the desired three dimensional configuration.

2. A method according to claim 1 wherein said material is thermoplastic synthetic polymeric material having a softening point of from 200° F. to 400° F. and the article is a shoe component.

References Cited

UNITED STATES PATENTS

| | | | |
|---|---|---|---|
| 2,474,567 | 6/1949 | Applegate | 118—50 |
| 3,035,292 | 5/1962 | Heaton et al. | 12—142 |
| 3,076,987 | 2/1963 | Shuttleworth | 12—142 |
| 3,461,838 | 8/1969 | Nelson et al. | 118—50 |
| 3,277,867 | 10/1966 | Kilham et al. | 118—204 |
| 3,316,573 | 5/1967 | Chaplick et al. | 12—146D |
| 3,545,795 | 12/1970 | Closson | 12—146D |

PATRICK D. LAWSON, Primary Examiner

U.S. Cl. X.R.

118—204